United States Patent [19]
Tracht et al.

[11] Patent Number: 5,264,766
[45] Date of Patent: Nov. 23, 1993

[54] WIPER MOTOR HIGH CURRENT PROTECTION PTC

[75] Inventors: Steven L. Tracht, Brighton, Mich.; Eugene B. Porter, Beavercreek, Ohio; Christopher H. Jones, Dayton, Ohio; Richard L. Ponziani, Dayton, Ohio

[73] Assignee: General Motors Corporation, Detroit, Mich.

[21] Appl. No.: 942,920

[22] Filed: Sep. 10, 1992

[51] Int. Cl.$^5$ .................................. B60S 1/02
[52] U.S. Cl. .................................. 318/443; 318/444; 15/250.13; 15/250.16; 361/27
[58] Field of Search ............... 318/443, 444, 483, 480, 318/475, 476; 15/250.12, 250.13, 250.16, 250.17, 250.18; 361/27, 25, 24, 59

[56] References Cited

U.S. PATENT DOCUMENTS

| | | | |
|---|---|---|---|
| 3,614,573 | 10/1971 | Rieman | 318/443 |
| 3,624,477 | 11/1971 | Rieman | 318/443 |
| 4,692,677 | 9/1987 | Bauer et al. | 318/443 |
| 4,798,102 | 1/1989 | Buschur et al. | 74/600 |
| 4,878,398 | 11/1989 | Heinrich | 74/959 |
| 4,924,726 | 5/1990 | Rogakos et al. | 74/600 |
| 5,030,899 | 7/1991 | Nishibe et al. | 318/444 |
| 5,099,184 | 3/1992 | Hornung et al. | 318/375 |

Primary Examiner—William M. Shoop, Jr.
Assistant Examiner—John W. Cabeca
Attorney, Agent, or Firm—Vincent A. Cichosz

[57] ABSTRACT

In a vehicle window wiper system having an electric drive motor with high, low and common brushes, electric motor energizing apparatus and forward and reverse motor operation, an auto-resetting current limiting device provides non-sacrificial protection to motor windings and associated circuitry during the various modes of motor operation.

4 Claims, 2 Drawing Sheets

WIPER MOTOR HIGH CURRENT PROTECTION PTC

BACKGROUND OF THE INVENTION

This invention relates to electric motor driven wiper systems for motor vehicle glass areas and particularly to systems having electric dynamic braking of the motor, high and low speed forward modes of motor operation and a reverse mode of motor operation. More specifically, the invention addresses protection of the motor windings and associated wiring from potentially damaging high current conditions.

In prior art wiper systems having typical dynamic brake features, a normally open dynamic brake shunt circuit is coupled between ground and a forward mode power brush, and a forward mode common brush is coupled to ground. During dynamic braking, the circuit providing power to drive the motor is opened and the shunt circuit is closed so that the motor's back e.m.f. generated at the forward mode power brush as a result of motor rotation is shunted to ground, thus effectuating a quick stop of the motor due to the back e.m.f. counteracting the forward rotation of the motor. High current protection is commonly part of the dynamic brake shunt circuit to prevent motor and/or wiring damage should the shunt circuit close while the circuit providing power is still closed and the motor is running in a forward mode. A fusible link in the shunt circuit designed to burn open before motor and/or circuit damage can occur is a commonly employed type of high current protection.

In prior art systems having reverse mode of operation, such as is associated with a reverse-to-park depressed park feature, reversal of the motor is accomplished by switching motor brush polarity from that of a forward mode of operation. The forward mode common brush is taken from ground potential up to the power source potential and a forward mode power brush, normally at a high potential during forward mode operation, is coupled to ground via a reverse mode ground circuit. Mechanical protection is commonly employed in reverse mode of operation to prevent motor and/or wiring damage should a wiper blade become obstructed before reaching its park position. This type of mechanical protection is known in the art as a snow clutch and is effective to allow the motor armature to continue to rotate when the wiper blades are obstructed thereby preventing stall of the motor and subsequent burnout of the motor windings or wiring due to high current therethrough.

Prior art systems perform satisfactorily as designed but improvements can be made. For example, fusible links or the like placed in a dynamic brake shunt circuit are sacrificial high current protection in that they must be replaced each time one burns open. Dynamic braking is lost until repair is effectuated. Not uncommon is such a fusible link etched onto a circuit board which, should it burn open, necessitates replacement of the entire circuit board. This arrangement adds expense beyond that of the fusible link itself and inconvenience to a repair. A mechanical to park snow clutch is subject to typical mechanical failure modes, increases mechanical complexity of the wiper system and comes with a mass penalty. High current protection which is non-sacrificial, is effective in various modes of motor operation and which reduces mechanical complexity and associated mass is therefore desirable.

SUMMARY OF THE INVENTION

This invention provides for non-sacrificial high current motor winding and wiring protection which is used in a combined dynamic brake shunt/reverse mode ground circuit. High current protection is provided during dynamic braking, during forward mode motor operation in the event the dynamic brake shunt circuit closes and during reverse mode motor operation, such as is used to park the wipers in a depressed position. Non-sacrificial current limiting means eliminates the need to replace a spent high current protection device and eliminates the need for a mechanical snow clutch in a system properly designed to carry a stalling load prior to the current limiting device becoming effective.

In a specific form of the invention, non-sacrificial high current protection comprises a positive thermal coefficient (PTC) thermistor. A PTC thermistor provides a low resistance path under normal current conditions and a high resistance path under abnormally high current conditions thus limiting the current and providing protection for the motor and associated circuitry. A PTC thermistor reacts to heat generated by current therethrough in substantially a resistive step function such that when a sufficiently high current is encountered for a sufficient period the PTC thermistor assumes a high resistance. The PTC will continue to assume a high resistance until the voltage across it is removed; a trickle current therethrough is sufficient to latch the PTC thermistor in a high resistance state. With the voltage removed, a PTC thermistor independently reverts back to a low resistance, thus in effect resetting itself when it is appropriate to do so without user intervention. Since it is non-sacrificial, the PTC thermistor remains effective through successive trip/reset cycles to protect against high current conditions.

Further details and advantages of the invention will be apparent from the accompanying drawings and following description of the preferred embodiment.

BRIEF DESCRIPTION OF THE DRAWINGS

The above and other advantages of this invention will become more apparent from the following description taken in conjunction with the accompanying drawings wherein.

DETAILED DESCRIPTION OF THE PREFERRED EMBODIMENT

Figure 1:
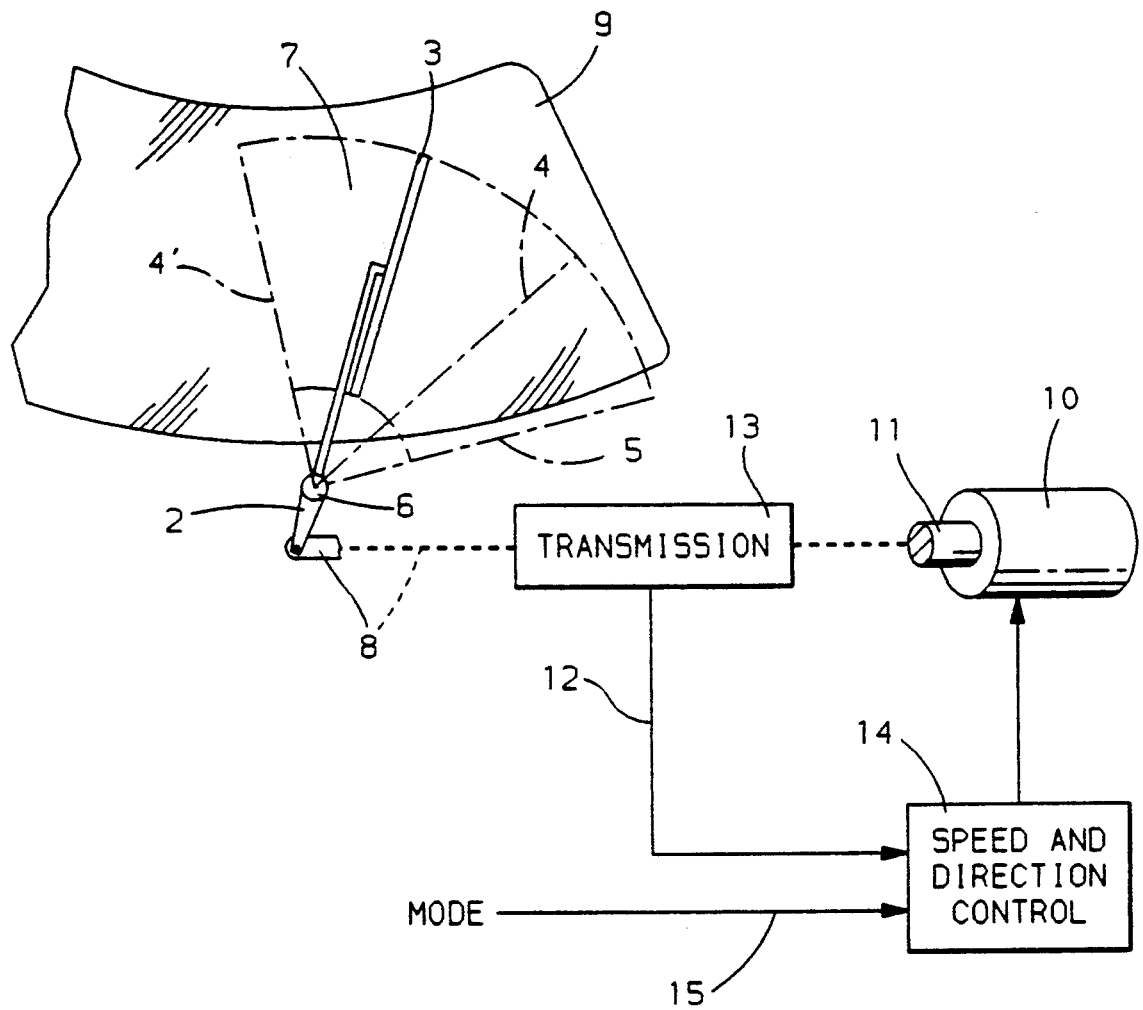
FIG. 1 is a schematic and block diagram of a wiper system capable of various modes of operation known in the art and as utilized in the current invention.

Referring to FIG. 1, a vehicle windshield wiper system has a two speed reversible DC motor 10 with output shaft 11 imparting rotational motion to transmission components 13. Control 14 establishes speed, rotational motion (forward or reverse), and electric dynamic braking of motor 10 predicated upon position inputs 12 from transmission components 13 and user selected mode inputs 15. At least one wiper arm 2 is pivotally coupled at a point 6 between its ends to a vehicle body. Wiper blade 3 is fixed to one end of wiper arm 2 and in contact with windshield 9. Wiper end of drive rod 8 is coupled to the other end of wiper arm 2. Transmission components 13 comprise reduction gearing and mechanical linkage as between output shaft 11 and the transmission end of drive rod 8 to translate forward rotational motion of motor 10 to reciprocating motion at the wiper end of drive rod 8. Reciprocating motion of drive rod 8 at the wiper end is thereby transferred to at least one wiper arm 2 to move wiper blade 3 back and forth between direction reversing innerwipe position 4 and outerwipe position 4' to define a clearing area 7 on windshield 9. Depressed park position 5, typically low on windshield 9 and below the hood line of the vehicle so as to conceal the wiper blade when not in use, is adjacent innerwipe position 4 and outside clearing area 7. Wiper blade 3 comes to rest at position 5 when, in response to reverse rotational motion of motor 10, transmission components 13 increase the effective length of drive rod 8 and thus increases the travel of wiper blade 3 beyond innerwipe position 4. Wiper transmission components of this type embodying the aforementioned mechanical functions are known from U.S. Pat. Nos. 4,798,102, 4,924,726 and 4,878,398.

Figure 2:
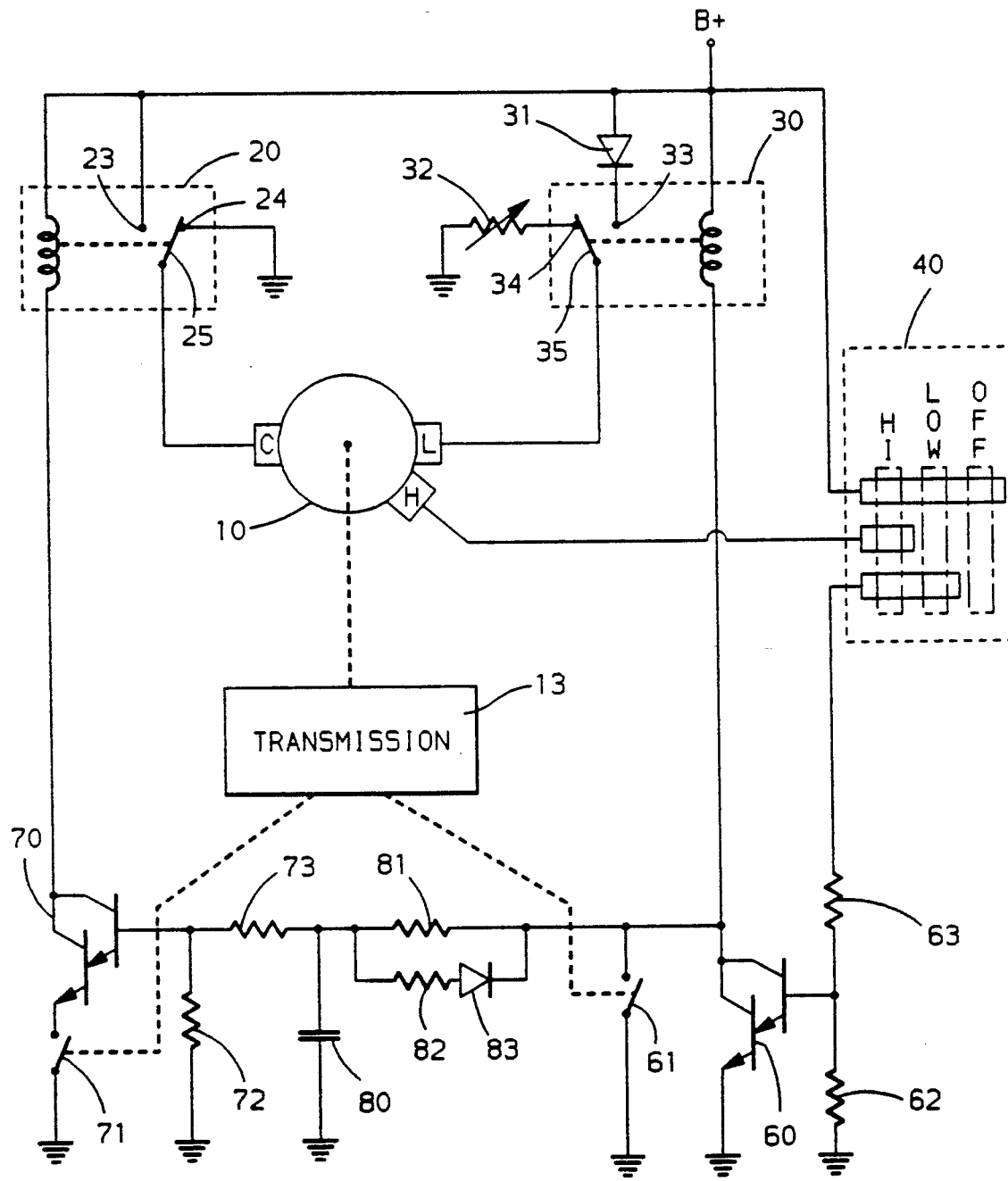
FIG. 2 shows an embodiment of a PTC thermistor high current protected wiper system according to the invention.

Position inputs 12 originate from park switch 71 and innerwipe switch 61 as illustrated in FIG. 2. Park switch 71 is open when wiper blade 3 is in park position 5 and is closed when wiper blade 3 is out of park position 5. Innerwipe switch 61 closes just after wiper blade 3 leaves innerwipe position 4 to begin a wipe cycle, opens just prior to returning to innerwipe position 4 and is open during reverse motor operation and while wiper blade 3 is in park position 5. Park switch 71 and innerwipe switch 61 may be conventional contact plate/brush type switches or leaf spring/cam type switches as used in the art. User selected mode inputs 15 are established by the position of conventional wiper system mode switch 40 as shown in FIG. 2.

Motor 10 has low speed forward and high speed forward brushes, respectively designated L and H, and a forward common brush designated C. Modes of motor operation include forward low and high speeds, reverse for parking wiper blades and dynamic brake for minimizing wiper blade coast and overshoot when motor is controlled off from a forward mode of operation. Motor 10 operates in a forward mode when one of the forward brushes L or H is at a high potential and common brush C is at a low potential. Typically, high potential is vehicle system voltage designated B+ and low potential is vehicle system ground. When B+ is applied to forward brush L to the exclusion of forward brush H, motor 10 operates in low speed forward mode. When B+ is applied to forward brush H to the exclusion of forward brush L, motor 10 operates in a high speed forward mode. Motor 10 operates in a reverse mode when one of the forward brushes L or H is at ground and forward common brush C is at B+, effectively reversing the polarity of the motor brushes from that of forward mode operation. High speed motor operation in reverse to park is not necessary or desirable for a controlled park; therefore, forward brush L is the brush chosen to be at ground when forward common brush C is at B+ so as to establish a low speed reverse mode of operation. Motor 10 operates in a dynamic brake mode when brushes L and C are shorted together immediately after power is removed from motor 10. The shorting of brushes L and C together is caused to occur through system ground. The foregoing modes of operation are well known to those skilled in the art.

In one form of the present invention the modes of motor operation are established through two motor energizing relays 20 and 30 and by position of mode switch 40. Relays 20 and 30 are energized and deenergized in response to the user selected position of mode switch 40 and positions of wiper blade 3 as indicated by park switch 71 and innerwipe switch 61. Both relays 20 & 30 are conventional single pole/double throw variety, each having a movable contact and first and second stationary contacts. When each respective relay is energized, its movable contact completes a circuit exclusively with the first stationary contact. When each respective relay is deenergized, its movable contact completes a circuit exclusively with the second stationary contact. Relay 20 first stationary contact 23 is coupled to B+, and relay 20 second stationary contact 24 is coupled to ground. Relay 30 first stationary contact 33 is coupled to the cathode of diode 31, the anode of which is coupled to B+. Relay 30 second stationary contact 34 is coupled to ground in series with PTC thermistor 32. Relay 20 movable contact 25 is coupled to forward common brush C and relay 30 movable contact 35 is coupled to forward brush L.

Forward brush H is coupled to B+ through mode switch 40 when it is in HIGH position, and is open through switch 40 when it is in any other position. Forward common brush C is coupled to B+ when relay 20 is energized, and is coupled to ground when relay 20 is deenergized. Forward brush L is coupled to the cathode of diode 31 when relay 30 is energized and is coupled to ground in series with PTC thermistor 32 when relay 30 is deenergized.

The various modes of motor operation and corresponding functions of PTC thermistor 32 are illustrated below assuming, initially, mode switch 40 has been OFF for a time sufficient for the wiper system to reach a steady state with wiper blade 3 in depressed park position 5, both relays 20,30 deenergized, and park and innerwipe switches 71,61 open. When mode switch 40 is switched to a forward mode of operation, either LOW or HIGH, B+ is supplied across series combination of resistors 63 and 62 so as to establish a biasing voltage therebetween coupled to the base the first stage of a first Darlington configured pair of transistors 60. Transistors 60, when biased on, supply a ground path to relay 30 energizing the same and thereby coupling forward brush L to the cathode of diode 31. Transistors 60 also supply a ground path to swiftly discharge capacitor 80—which is fully charged in steady state OFF— through discharge resistor 82 and forward biased diode 83. If mode switch 40 is switched to LOW, diode 31 will be forward biased, power will be supplied to forward brush L, forward brush H will be open, and motor 10 will operate in low speed forward mode. Alternatively, if mode switch 40 is switched to HIGH, power will be supplied to forward brush H, diode 31 will be reverse biased by the back e.m.f. generated at forward brush L by high speed operation thereby electrically opening forward brush L, and motor 10 will operate in high speed forward mode.

In either forward mode, wiper blade 3 moves out of park position 5 and park switch 71 closes. Shortly thereafter wiper blade 3 continues past innerwipe position 4 and innerwipe switch 61 closes supplying a ground path to relay 30, apparently functionally redundant with transistors 60. However, should mode switch 40 be switched OFF while wiper blade 3 is in the middle of a cycle, the bias to transistors 60 would be lost but innerwipe switch 61 would continue to supply a ground path to relay 30 thus allowing the cycle to complete. Also, for the short interval during a forward mode when innerwipe switch 61 is open just prior to reaching innerwipe position 4 until just after leaving innerwipe position 4, transistors 60 provide the ground path to relay 30 necessary for continued forward mode operation. Therefore, at anytime during which mode switch 40 is switched to LOW or HIGH, a ground path to relay 30 is supplied either through transistors 60 or innerwipe switch 61. These ground paths also effectively force the base of the first stage of a second Darlington configured pair of transistors 70 to ground potential through resistors 73 and 72 resulting in transistors 70 being biased off to effectuate an open circuit ensuring a deenergized relay 20 throughout forward mode operation. Park switch 71 therefore has no effect during forward mode operation since it is operative in series with transistor pair 70. PTC thermistor 32 has no active function in any forward mode since relay 30 is energized and PTC 32 is open at stationary contact 34. If, however, forward brush L becomes shorted to the second stationary contact or associated wiring during a forward mode by way of a wiring short or internal relay 30 short, the voltage at brush L (whether system voltage B+ in LOW or the generated e.m.f. in HIGH) would source current through PTC thermistor to ground. PTC thermistor 32 would respond by assuming a high resistance, thereby limiting current therethrough and allowing motor 10 to continue forward operation while preventing damage to motor 10 windings and/or wiring. After voltage is removed from across PTC thermistor 32, it will revert back to a low resistance state.

When, from either forward mode, mode switch 40 is switched OFF, the current wipe cycle is allowed to continue by virtue of innerwipe switch 61 as explained. However, when wiper blade 3 reaches the point just prior to innerwipe position 4 where innerwipe switch 61 opens, relay 30 is deenergized and forward brush L is coupled to ground through PTC thermistor 32. Forward common brush C continues to be coupled to ground because relay 20 remains deenergized since transistors 70 immediately remain biased off. The e.m.f. then present at forward brush L due to the continuing inertial rotation of the motor armature is shunted across forward brush L and forward common brush C through ground. Both relays being in a deenergized state defines the dynamic braking mode whereby rotation of motor 10 is abruptly stopped with minimal coast of wiper blade 3 which comes to rest at innerwipe position 4, ready to move into park position 5. As this occurs, the relatively low resistance of motor 10 windings may pass a relatively high current for a short period until motor 10 stops. If this current is excessively high for a sufficient period, PTC thermistor 32 will take on a high resistance state and prevent damage by limiting current through motor 10 windings and associated wiring. PTC thermistor 32 would then revert back to a low resistance state when the voltage is removed.

Transistors 70 remain biased off during the dynamic braking of motor 10 as initiated by the opening of innerwipe switch 61 and consequent removal of ground and deenergization of relay 30. Shortly thereafter, transistors 70 will become biased on by a bias voltage established between resistors 73 and 72. When innerwipe switch 61 opens, resistor 73 is pulled up to a high potential at node 74 at a rate controlled by the RC time constant established by resistor 81 and capacitor 80. The charge time of capacitor 80 dictates how long after the opening of innerwipe switch 61 transistors 70 will be biased on, the RC time constant being chosen such that sufficient time is allowed for wiper blade 3 to come to rest at innerwipe position 4, ready to move into park position 5. Diode 83 prevents swift charge up of capacitor 80 through discharge resistor 82. Transistors 70, when biased on, supply a ground path in series with a closed park switch 71 to relay 20, energizing the same and thereby coupling forward common brush C to B+. Motor 10 polarity is now reversed from that of forward low speed mode of operation with forward common brush being coupled to power and forward brush L being coupled to ground through PTC thermistor 32. Motor 10 operates in a low speed reverse mode and transmission components 13 increase the effective length of drive rod 8 to move wiper blade 3 into park position 5. When park position 5 is reached, park switch 71 opens, deenergizing relay 20 and causing forward common brush C to short to ground thus causing dynamic braking of motor 10. If during reverse mode operation motor 10 is caused to stall, such as when an obstruction prevents wiper blade 3 travel, current through motor 10 windings will increase. If the current becomes excessive for a sufficient period, PTC thermistor 32 will take on a high resistance state and limit the current passing through the motor windings and associated wiring to prevent damage. Removal of the obstruction to park position 5 would not alone allow the PTC to revert back to a low resistance. Rather, removal of the voltage across PTC thermistor 32 is required, such as is accomplished when the vehicle is turned off or a forward mode of operation is once again invoked. It is noted here that since PTC thermistor 32 is auto-resetting and not sacrificial, the dynamic braking shunt circuit is not lost.

Resistors 73 and 72 are chosen relatively large to minimize current passed therethrough when mode switch 40 is in OFF and a steady state has been reached. Discharge resistor 82 is chosen relatively small to ensure swift discharge of capacitor 80 through diode 83 when mode switch is switched from OFF to a forward mode. Quick discharge removes any bias voltage then present at transistors 70 so that relay 20 remains deenergized during early forward mode operation when park switch 71 closes upon wiper blade 3 leaving park position 5. Exemplary component values are listed in the table below.

| Component | Value |
| --- | --- |
| Resistor 62 | 24 Kohm |
| Resistor 63 | 24 Kohm |
| Resistor 72 | 100 Kohm |
| Resistor 73 | 100 Kohm |
| Resistor 81 | 20 Kohm |
| Resistor 82 | 360 ohm |
| Capacitor 80 | 33 uF |

Excessively high current for purposes of this invention is defined with regard to motor 10 windings and associated wiring capacities to pass current without risk of burning the windings or wiring and will depend upon choice of motor 10 and wiring. Therefore, PTC thermistor 32 is chosen with regard to the particular motor 10 and wiring current capacities such that PTC thermistor 32 will take on a high resistance state before motor 10 or wiring current capacity is sustained for a period, thereby protecting the windings and wiring. The precise operating parameters of PTC thermistor 32 are critical to the particular motor 10 and wiring application but are only critical to the invention in so far as they must be chosen to adequately protect the motor 10 windings and wiring and not trip prematurely during normal dynamic brake and park modes.

The foregoing description of a preferred embodiment is intended to be taken by way of illustration and not of limitation as to the spirit and scope of the invention. While the present invention has been described with electromechanical relays performing switching functions, solid state relays and switches may be substituted to perform switching functions within the scope of the invention.

The embodiments of the invention in which an exclusive property or privilege is claimed are defined as follows:

1. An energizing apparatus for a wiper motor of a vehicle window wiper system, the motor including first and second brushes and the wiper system including a wiper having a park position, an outer position and an inner position intermediate the outer and park positions, the wiper being moved out of the park position and thereafter back and forth between the inner and outer positions when the motor is operated in a forward mode and being moved to the park position when the motor is operated in a reverse mode, the energizing apparatus comprising in combination:

a control switch operable between on and off positions;
   an electric power source having first and second power terminals;
   a positive thermal coefficient thermistor;
   means responsive to either one of A) the control switch being at the on position and B) the wiper being intermediate the inner and outer positions for coupling the first brush to the first power terminal and coupling the second brush to the second power terminal to establish a forward mode of motor operation;
   means responsive to both A) the control switch being at the off position and B) the wiper being at the inner position for coupling the first brush to the second power terminal through the positive thermal coefficient thermistor and coupling the second brush to the second power terminal for a dynamic braking interval to establish a dynamic braking mode of motor operation for said interval; and
   means responsive to the expiration of the dynamic braking interval for coupling the first brush to the second power terminal through the positive thermal coefficient thermistor and coupling the second brush to the first power terminal to establish a reverse mode of motor operation, whereby the positive thermal coefficient thermistor repeatably limits motor current during the dynamic braking and reverse modes of motor operation.

2. An energizing apparatus for a wiper motor of a vehicle window wiper system, the motor including first, second and third brushes and the wiper system including a wiper having a park position, an outer position and an inner position intermediate the outer and park positions, the wiper being moved out of the park position and thereafter back and forth between the inner and outer positions when the motor is operated in a forward mode and being moved to the park position when the motor is operated in a reverse mode, the energizing apparatus comprising in combination:

a control switch having low speed, high speed and off positions;
   an electric power source having first and second power terminals;
   a positive thermal coefficient thermistor;
   means responsive to either one of A) the control switch being at the low speed position and B) the control switch being at either the off or the low speed position and the wiper being intermediate the inner and outer positions for coupling the first brush to the first power terminal, coupling the second brush to the second power terminal and opening the third brush to establish a low speed forward mode of motor operation;
   means responsive to the control switch being at the high speed position for opening the first brush, coupling the second brush to the second power terminal and coupling the third brush to the first power terminal to establish a high speed forward mode of motor operation;
   means responsive to both A) the control switch being at the off position and B) the wiper being at the inner position for coupling the first brush to the second power terminal through the positive thermal coefficient thermistor, coupling the second brush to the second power terminal and opening the third brush for a dynamic braking interval to establish a dynamic braking mode of motor operation for said interval; and
   means responsive to the expiration of the dynamic braking interval for coupling the first brush to the second power terminal through the positive thermal coefficient thermistor, coupling the second brush to the first power terminal and opening the third brush to establish a low speed reverse mode of motor operation, whereby the positive thermal coefficient thermistor repeatably limits motor current during the dynamic braking and low speed reverse modes of motor operation.

3. In a vehicle window wiper system having an electric drive motor with a high speed brush, a low speed brush and a common brush, an electric motor energizing apparatus comprising in combination:

an electric power source having first and second terminals;
   a first switch (40) connected between the high speed brush and first terminal of the electric power source;
   a second switch (35,34) connected between the low speed brush and the second terminal of the electric power source in series with a positive thermal coefficient thermistor;
   a third switch (25,24) connected between the common brush and the second terminal of the electric power source;
   a fourth switch (25,23) connected between the common brush and the first terminal of the electric power source;
   means for establishing a high speed forward mode of motor operation by closing the first and third switches and opening the second and fourth switches;
   means for establishing a forward dynamic braking mode of motor operation by opening the first and fourth switches and closing the second and third switches; and
   means for establishing a reverse low speed mode of motor operation by closing the second and fourth switches and opening the first and third switches, whereby the positive thermal coefficient thermistor is effective to limit motor current in the reverse low speed and forward dynamic braking mode of operation and further in the high speed forward mode of operation if the second switch closes.

4. The vehicle wiper system of claim 3 further comprising:

a fifth switch (35,33) connected between the low speed brush and the first terminal of the electric power supply in series with a diode; and means for establishing a low speed forward mode of motor operation by opening the first, second and fourth switches and closing the third and fifth switches, the fifth switch further being closed by the means for establishing the high speed forward mode of motor operation.

* * * * *